(12) United States Patent
Hanazawa et al.

(10) Patent No.: US 11,368,425 B2
(45) Date of Patent: Jun. 21, 2022

(54) ENUM/DNS SERVER, ENUM/DNS SYSTEM, AND CONTROL METHOD FOR ENUM/DNS SYSTEM

(71) Applicant: Nippon Telegraph and Telephone Corporation, Tokyo (JP)

(72) Inventors: Yuki Hanazawa, Tokyo (JP); Satoshi Shimizu, Tokyo (JP); Shiro Aoshima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/966,304

(22) PCT Filed: Feb. 18, 2019

(86) PCT No.: PCT/JP2019/005784
§ 371 (c)(1),
(2) Date: Jul. 30, 2020

(87) PCT Pub. No.: WO2019/163697
PCT Pub. Date: Aug. 29, 2019

(65) Prior Publication Data
US 2020/0374261 A1 Nov. 26, 2020

(30) Foreign Application Priority Data
Feb. 20, 2018 (JP) .............................. JP2018-027718

(51) Int. Cl.
*H04L 61/4557* (2022.01)
*H04L 61/4511* (2022.01)
(Continued)

(52) U.S. Cl.
CPC ........ *H04L 61/157* (2013.01); *H04L 61/1511* (2013.01); *H04L 69/08* (2013.01); *H04L 61/605* (2013.01)

(58) Field of Classification Search
CPC ..... H04L 61/157; H04L 61/1511; H04L 69/08
(Continued)

(56) References Cited

U.S. PATENT DOCUMENTS

| 8,194,642 B2 * | 6/2012 | Rosenberg .......... H04L 65/1063 370/352 |
| 8,638,908 B2 * | 1/2014 | Leeds ................... H04M 1/656 379/76 |

(Continued)

FOREIGN PATENT DOCUMENTS

| JP | 2012253575 A | * 12/2012 |
| JP | 2016111448 A | * 6/2016 |

(Continued)

OTHER PUBLICATIONS

[No Author Listed], "JJ-90.31 Common interconnection interlace for carrier ENUM/," The Telecommunication Technology Committee. May 25, 2017, 50 pages (with English Translation).

(Continued)

*Primary Examiner* — Umar Cheema
*Assistant Examiner* — Tony Williams
(74) *Attorney, Agent, or Firm* — Fish & Richardson P.C.

(57) ABSTRACT

An ENUM/DNS system with enhanced processing efficiency is provided. Provided is an ENUM/DNS system including an ENUM/DNS client that performs a connection destination information query indicating a connection destination associated with a telephone number of a destination terminal added to a connection request transmitted from an originating terminal, and an ENUM/DNS server that receives the connection destination information query and outputting the connection destination as a connection destination information query response. The ENUM/DNS server includes a determination unit configured to determine an attribute of the originating terminal based on the connection destination information query, and a conversion unit configured to convert a SIP domain included in REGEXP of the connection destination information query response to a SIP domain indicating the connection destination based on the attribute.

8 Claims, 9 Drawing Sheets

(51) Int. Cl.
*H04L 69/08* (2022.01)
*H04L 67/04* (2022.01)
*H04L 67/565* (2022.01)
*H04M 3/00* (2006.01)
*H04L 101/65* (2022.01)

(58) Field of Classification Search
USPC .......................................................... 709/245
See application file for complete search history.

(56) References Cited

U.S. PATENT DOCUMENTS

2004/0215707 A1* 10/2004 Fujita ...................... H04L 29/06
709/201
2016/0065747 A1* 3/2016 Haspekian ............ H04L 61/605
370/352

FOREIGN PATENT DOCUMENTS

JP 6001512 B2 * 10/2016
WO WO-2008155460 A1 * 12/2008 ............... H04W 8/04

OTHER PUBLICATIONS

Mockapetris, "Domain Names—Implementation and Specification." Network Working Group, Nov. 1987, RFC 1035, 56 pages.

* cited by examiner

TEST TERMINAL 1a

| CONVERSION TARGET | AFTER CONVERSION |
|---|---|
| example1.ne.jp | example1.ne.jp |
| example2.ne.jp | stm.example0.ne.jp |
| example3.ne.jp | stm.example0.ne.jp |
| ⋮ | ⋮ |

GENERAL TERMINAL 1b

| CONVERSION TARGET | AFTER CONVERSION |
|---|---|
| example1.ne.jp | example1.ne.jp |
| example2.ne.jp | example2.ne.jp |
| example3.ne.jp | stm.example0.ne.jp |
| ⋮ | ⋮ |

Fig. 4

ENUM/DNS SERVER, ENUM/DNS SYSTEM, AND CONTROL METHOD FOR ENUM/DNS SYSTEM

CROSS-REFERENCE TO RELATED APPLICATIONS

This application is a National Stage application under 35 U.S.C. § 371 of International Application No. PCT/JP2019/005784, having an International Filing Date of Feb. 18, 2019, which claims priority to Japanese Application Serial No. 2018-027718, filed on Feb. 20, 2018. The disclosure of the prior application is considered part of the disclosure of this application, and is incorporated in its entirety into this application

TECHNICAL FIELD

The present invention relates to an ENUM/DNS server, an ENUM/DNS system, and a control method for the ENUM/DNS system under the condition that the number portability system for allowing the use of telephone numbers among different carriers is introduced in a system in which a plurality of carriers provide service networks (IP networks) for providing Internet Protocol (IP) telephony and those networks are interconnected. The present invention particularly relates to an ENUM/DNS server, an ENUM/DNS system, and a control method for the ENUM/DNS system in an environment in which both of an interconnection mode that utilizes the Integrated Services Digital Network User Part (ISUP) conventionally used in Public Switched Telephone Networks (PSTN) and an interconnection mode that utilizes the Session Initiation Protocol (SIP) used in IP networks coexist as a call control protocol used for interconnection between individual carriers.

BACKGROUND ART

An E.164 Number Mapping (ENUM)/Domain Name System (DNS) system has hitherto been proposed as a system for apparatuses (such as SIP servers) in communication carrier networks to associate telephone numbers and Uniform Resource Identifiers (URIs) in IP networks. In the ENUM/DNS system, a SIP server installed in a network of a communication carrier inquires of an ENUM/DNS server about connection destination information (such as an IP address and a domain name) regarding a telephone number of a terminal (such as an IP phone) being a connection destination, and performs routing based on the connection destination information.

Further, along with migration from the PSTN networks to the IP networks, a system of number portability allowing a continuous use of fixed telephone numbers among different communication carriers in the IP networks is under study (see NPL 1). Schemes described in NPL 1 are as follows: An ENUM/DNS server utilizing a system of DNS includes a database that centrally manages number portability information of each communication carrier. A SIP server of each communication carrier accesses the ENUM/DNS server to determine whether or not each telephone number has been transferred (ported out) to another network, and then acquires connection destination information to perform communication.

FIG. 9 is a diagram illustrating a conventional example of an ENUM/DNS system. Note that although a plurality of communication carriers (A, B, C, D . . . ) are assumed, three functions are distinguished as communication carriers A, B, and C for the sake of description. Here, numbers managed by respective communication carriers A, B, and C and domains of the respective communication carriers A, B, and C are as described below. Note that the following examples of managed numbers and domains of the respective communication carriers will also apply to the description of the present embodiment to be described later.

Telephone numbers (10,000 telephone numbers) managed by originating carrier A (carrier that accommodates an originating user)
0422-58-0000 to 0422-58-9999
Telephone numbers (10,000 telephone numbers) managed by donor carrier B (carrier that acquired a user's number)
0422-59-0000 to 0422-59-9999
Telephone numbers (10,000 telephone numbers) managed by destination carrier C (carrier that accommodates a destination user)
0422-60-0000 to 0422-60-9999
Domains of respective communication carriers A, B, and C
Domain of originating carrier A: example0.ne.jp
Domain of donor carrier B: example1.ne.jp
Domain of destination carrier C: example2.ne.jp First, "connection request message (SIP request)" (annotated as "CONNECTION REQUEST" in FIG. 9) from an originating terminal (for example, a terminal with a telephone number of 0422-58-0001) to a destination terminal (for example, a terminal with a telephone number of 0422-60-9999) is transmitted to an ENUM/DNS client 60 (Step S11).

The ENUM/DNS client 60 that has received the connection request message performs, to an ENUM/DNS server 50, a query ("connection destination information query message (ENUM query)"; annotated as "CONNECTION DESTINATION INFORMATION QUERY" in FIG. 9) about connection destination information (such as a URI associated with a destination telephone number) to connect to a communication carrier of the destination (destination carrier C) (Step S12). In this case, the query is transmitted to the ENUM/DNS server 50, with QNAME of the ENUM query being "9.9.9.9.0.6.2.2.4.1.8.e164enum.net.".

When the ENUM/DNS server 50 receives the connection destination information query message, the ENUM/DNS server 50 refers to its own storage unit and extracts connection destination information associated with the destination terminal, and transmits response information ("connection destination information query response message (ENUM answer)"; annotated as "CONNECTION DESTINATION INFORMATION QUERY RESPONSE" in FIG. 9) to the ENUM/DNS client 60 (Step S13). In this case, the response information is transmitted to the ENUM/DNS client 60, with REGEXP of the ENUM answer being "!^.*$!sip:+81422609999@exapmle2.ne.jp;user=phone!".

When the ENUM/DNS client 60 receives connection destination information included in the connection destination information query response message, for example, the ENUM/DNS client 60 makes a determination, such as one that the ENUM/DNS client 60 connects to the destination terminal via the IP-Point Of Interface (POI) when the originating terminal is a test terminal and one that the ENUM/DNS client 60 connects to the destination terminal via the synchronous transfer mode (STM)-POI when the originating terminal is a general terminal. Then, when the originating terminal is a general terminal and the ENUM/DNS client 60 determines to carry out connection via the STM-POI, the ENUM/DNS client 60 transmits a SIP signal to the PSTN of the originating carrier A (Step S14). Subsequently, an ISUP signal is transferred from the PSTN of the originating carrier A to the PSTN of the destination carrier C (Step S15). In contrast, when the originating terminal is a test terminal and the ENUM/DNS client 60 determines to carry out connection via the IP-POI, the ENUM/DNS client 60 transmits a SIP signal to an IP network (other IP network) 3000 of the destination carrier C (Step S16).

Note that, when the ENUM/DNS server 50 does not store connection destination information associated with the destination terminal in Step S13 described above, the ENUM/DNS server 50 performs, to an IP network (other IP network) 2000 of the donor carrier B, a query ("connection destination information query message (ENUM query)"; annotated as "CONNECTION DESTINATION INFORMATION QUERY" in FIG. 9) about connection destination information to connect to the destination carrier C (Step S17), and receives response information ("connection destination information query response message (ENUM answer)"; annotated as "CONNECTION DESTINATION INFORMATION QUERY RESPONSE" in FIG. 9) from the IP network (other IP network) 2000 of the donor carrier B (Step S18).

CITATION LIST

Non Patent Literature

NPL 1: "JJ-90.31 Common interconnection interface for carrier ENUM" General Incorporated Association The Telecommunication Technology Committee, Aug. 27, 2015 NPL 2: Domain Names: Implementation and Specification, [online], [searched on Feb. 6, 2018], the Internet <URL: https://www.ietf.org/rfc/rfc1035.txt>

SUMMARY OF THE INVENTION

Technical Problem

Incidentally, in the conventional ENUM/DNS system, the ENUM/DNS server transmits the acquired connection destination information query response message (ENUM answer) to the ENUM/DNS client without converting the ENUM answer (see the annotations "REGEXP PART OF ENUM ANSWER" of FIG. 9).

Such a system requires the ENUM/DNS client that has received the ENUM answer to make a determination by itself, such as one that the ENUM/DNS client connects to the destination terminal via the IP-POI when the originating terminal is a test terminal, for example, and one that the ENUM/DNS client connects to the destination terminal via the STM-POI when the originating terminal is a general terminal. In addition, to prevent errors that may occur when all the connections between originating terminals and destination terminals is simultaneously switched from connection via the STM-POI to connection via the IP-POI, the ENUM/DNS client is required to perform configuration modification by itself, which involves a procedure in which the ENUM/DNS client first switches connection of only the test terminal to connection via the IP-POI, and on the condition that there is no problem observed (on the condition that the test terminal succeeds in making a call), the ENUM/DNS client then sequentially switches connection of the general terminals to connection via the IP-POI, for example.

In other words, there has been a problem that processing efficiency of the entire ENUM/DNS system is reduced when the ENUM/DNS clients, which have lower performance than the ENUM/DNS servers and are provided more than the number of ENUM/DNS servers, perform the processing described above.

The present invention has been made in view of such circumstances, and the present invention has an object to provide an ENUM/DNS system with enhanced processing efficiency.

Means for Solving the Problem

To solve the problem described above, the invention according to claim 1 pertains to an ENUM/DNS server for receiving, from an ENUM/DNS client, a connection destination information query indicating a connection destination associated with a telephone number of a destination terminal added to a connection request transmitted by an originating terminal and outputting the connection destination as a connection destination information query response, the ENUM/DNS server including: a determination unit configured to determine an attribute of the originating terminal, based on the connection destination information query; and a conversion unit configured to convert a SIP domain included in REGEXP of the connection destination information query response to a SIP domain indicating the connection destination, based on the attribute.

Further, the invention according to claim 4 pertains to an ENUM/DNS system comprising: an ENUM/DNS client that performs a connection destination information query indicating a connection destination associated with a telephone number of a destination terminal added to a connection request transmitted from an originating terminal; and an ENUM/DNS server that receives the connection destination information query and output the connection destination as a connection destination information query response, wherein the ENUM/DNS server includes a determination unit configured to determine an attribute of the originating terminal, based on the connection destination information query, and a conversion unit configured to convert a SIP domain included in REGEXP of the connection destination information query response to a SIP domain indicating the connection destination, based on the attribute.

Further, the invention according to claim 7 pertains to a control method for an ENUM/DNS system, the ENUM/DNS system including an ENUM/DNS client that performs a connection destination information query indicating a connection destination associated with a telephone number of a destination terminal added to a connection request transmitted from an originating terminal, and the ENUM/DNS server that receives the connection destination information query and outputting the connection destination as a connection destination information query response, the control method for the ENUM/DNS server including determining, by the ENUM/DNS server, an attribute of the originating terminal, based on the connection destination information query, and converting, by the ENUM/DNS server, a SIP domain included in REGEXP of the connection destination information query response to a SIP domain indicating the connection destination, based on the attribute.

Adopting such a configuration enables the following operation: the ENUM/DNS server determines an attribute of the originating terminal, converts a SIP domain included in REGEXP of an ENUM answer based on the attribute of the originating terminal, and transmits the converted SIP domain to the ENUM/DNS client. Accordingly, the ENUM/DNS clients, which have lower performance than the ENUM/DNS servers and are provided more than the number of ENUM/DNS servers, no longer need to perform ineffective processing such as the configuration modification. Consequently, the ENUM/DNS system with enhanced processing efficiency can be provided.

To solve the problem described above, the invention according to claim 2 pertains to an ENUM/DNS server for receiving, from an ENUM/DNS client, a connection destination information query indicating a connection destination associated with a telephone number of a destination terminal added to a connection request transmitted by an originating terminal and outputting the connection destination as a connection destination information query response, the ENUM/DNS server including: a determination unit configured to determine whether the originating terminal is a test terminal or a general terminal, based on the connection destination information query; and a conversion unit configured to, when the determination unit determines that the originating terminal is the test terminal, convert a SIP domain included in REGEXP of the connection destination information query response to a SIP domain indicating that the connection destination is a connection destination to be connected via an IP-POI, and when the determination unit determines that the originating terminal is the general terminal, convert the SIP domain included in the REGEXP of the connection destination information query response to a SIP domain indicating that the connection destination is a connection destination to be connected via either the IP-POI or an STM-POI.

Further, the invention according to claim 6 pertains to an ENUM/DNS system comprising: an ENUM/DNS client that performs a connection destination information query indicating a connection destination associated with a telephone number of a destination terminal added to a connection request transmitted from an originating terminal; and an ENUM/DNS server that receives the connection destination information query and output the connection destination as a connection destination information query response, wherein the ENUM/DNS server includes a determination unit configured to determine whether the originating terminal is a test terminal or a general terminal, based on the connection destination information query, and a conversion unit configured to, when the determination unit determines that the originating terminal is the test terminal, convert a SIP domain included in REGEXP of the connection destination information query response to a SIP domain indicating that the connection destination is a connection destination to be connected via an IP-POI, and when the determination unit determines that the originating terminal is the general terminal, convert the SIP domain included in the REGEXP of the connection destination information query response to a SIP domain indicating that the connection destination is a connection destination to be connected via either the IP-POI or an STM-POI.

Adopting such a configuration enables the following operation: when the originating terminal is a test terminal, the ENUM/DNS server converts a SIP domain included in REGEXP of an ENUM answer to a SIP domain indicating that the connection destination is a connection destination to be connected via the IP-POI, whereas when the originating terminal is a general terminal, the ENUM/DNS server converts a SIP domain included in REGEXP of an ENUM answer to a SIP domain indicating that the connection destination is a connection destination to be connected via the IP-POI or the STM-POI. Accordingly, the ENUM/DNS client no longer needs to perform configuration modification as in the conventional technology, which involves a procedure in which the ENUM/DNS client first switches connection of only the test terminal to connection via the IP-POI, and on the condition that there is no problem observed, the ENUM/DNS client then sequentially switches connection of the general terminals to connection via the IP-POI, for example. Consequently, the ENUM/DNS system with enhanced processing efficiency can be provided.

To solve the problem described above, the invention according to claim 3 pertains to an ENUM/DNS server for receiving, from an ENUM/DNS client, a connection destination information query indicating a connection destination associated with a telephone number of a destination terminal added to a connection request transmitted by an originating terminal and outputting the connection destination as a connection destination information query response, the ENUM/DNS server including: a determination unit configured to determine whether the originating terminal is a terminal accommodated by a first ENUM/DNS client or a terminal accommodated by a second ENUM/DNS client, based on the connection destination information query; and a conversion unit configured to, when the determination unit determines that the originating terminal is the terminal accommodated by the first ENUM/DNS client, convert a SIP domain included in REGEXP of the connection destination information query response to a SIP domain indicating that the connection destination is a connection destination to be connected via either the first ENUM/DNS client or the second ENUM/DNS client depending on the connection destination, and when the determination unit determines that the originating terminal is the terminal accommodated by the second ENUM/DNS client, convert the SIP domain included in the REGEXP of the connection destination information query response to a SIP domain indicating that the connection destination is a connection destination to be connected via either the first ENUM/DNS client or the second ENUM/DNS client depending on the connection destination.

Adopting such a configuration enables the following operation: when the originating terminal is a terminal accommodated by the first ENUM/DNS client and the connection destination is a terminal accommodated by the first ENUM/DNS client, the ENUM/DNS server converts a SIP domain included in REGEXP of an ENUM answer, whereas when the originating terminal is a terminal accommodated by the first ENUM/DNS client and the connection destination is a terminal accommodated by the second ENUM/DNS client, the ENUM/DNS server does not convert a SIP domain included in REGEXP of an ENUM answer. Accordingly, the ENUM/DNS client no longer needs to perform configuration modification every time the ENUM/DNS client is connected, depending on connection with a terminal accommodated in the first ENUM/DNS client or connection with a terminal accommodated in the second ENUM/DNS client, as in the conventional technology. Consequently, the ENUM/DNS system with enhanced processing efficiency can be provided.

To solve the problem described above, the invention according to claim 5 pertains to the ENUM/DNS system according to claim 4, wherein the ENUM/DNS client includes a selection unit configured to select the connection destination, based on the SIP domain converted by the conversion unit.

Further, the invention according to claim 8 pertains to the control method for the ENUM/DNS server according to claim 7, wherein the control method includes selecting, by the ENUM/DNS client, the connection destination, based on the converted SIP domain.

Adopting such a configuration enables the following operation: the ENUM/DNS client selects a connection destination, based on an ENUM answer that is appropriately converted by the ENUM/DNS server in advance. Accordingly, processing time can be reduced in the ENUM/DNS clients, which have lower performance than the ENUM/DNS servers and are provided more than the number of ENUM/DNS servers. Consequently, the ENUM/DNS system with enhanced processing efficiency can be provided.

Effects of the Invention

According to the present invention, the ENUM/DNS system with enhanced processing efficiency can be provided.

BRIEF DESCRIPTION OF DRAWINGS

FIG. 4 is a diagram illustrating specific examples of SIP domains converted in a conversion unit of the ENUM/DNS server according to the first embodiment.

DESCRIPTION OF EMBODIMENTS

An ENUM/DNS system according to embodiments for carrying out the present invention (hereinafter referred to as embodiments) will be described below.

First Embodiment

Configuration of ENUM/DNS System

Figure 1:
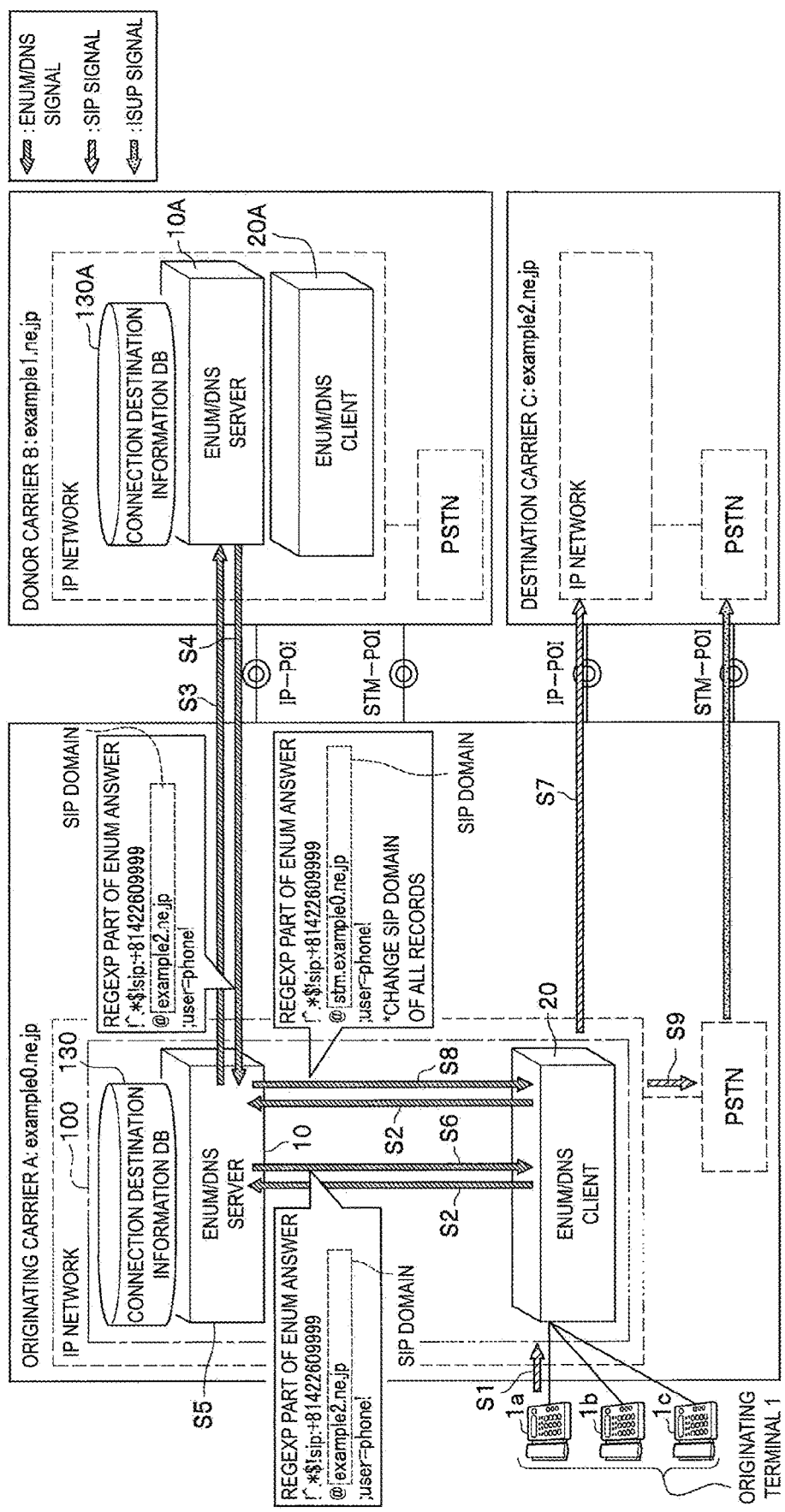
FIG. 1 is a diagram illustrating an overall configuration of an ENUM/DNS system according to a first embodiment.

As illustrated in FIG. 1, an ENUM/DNS system 100 according to the first embodiment includes an ENUM/DNS client (SIP server) 20 that performs a connection destination information query that indicates a connection destination associated with a telephone number of a destination terminal added to a connection request (SIP request) transmitted by an originating terminal 1 (a test terminal 1a, a general terminal 1b, or a general terminal Ic), and an ENUM/DNS server 10 that receives the connection destination information query (ENUM query) from the ENUM/DNS client 20 and outputs the connection destination as a connection destination information query response (ENUM answer).

As illustrated in FIG. 1, an originating carrier A, a donor carrier B, and a destination carrier C each include an IP network and a PSTN. The IP network of the originating carrier A and the IP network of the donor carrier B are connected via the IP-POI, and the IP network of the origi-nating carrier A and the IP network of the destination carrier C are connected via the IP-POI. Further, the PSTN of the originating carrier A and the PSTN of the donor carrier B are connected via the STM-POI, and the PSTN of the originating carrier A and the PSTN of the destination carrier C are connected via the STM-POI.

The ENUM/DNS system 100 according to the first embodiment has a feature in that the ENUM/DNS server 10 determines an attribute of the originating terminal 1 based on the connection destination information query, and converts a SIP domain included in REGEXP of the connection destination information query response to a SIP domain indicating the connection destination based on the attribute of the originating terminal 1. Another feature is that the ENUM/DNS client 20 selects the connection destination, based on the converted SIP domain.

An overview of processing performed by the ENUM/DNS server 10 according to the first embodiment will be briefly described below.

For example, when the ENUM/DNS server 10 receives an ENUM query from the ENUM/DNS client 20, the ENUM/DNS server 10 determines that the originating terminal 1 is a general terminal 1b, based on the ENUM query. Then, the ENUM/DNS server 10 overwrites REGEXP of an ENUM answer as follows: "!^.*$!sip:+81422609999@exapmle2.ne.jp;user=phone!"→"!^.*$!sip:+81422609999@stm.exapmle0.ne.jp;user=phone!"

In other words, the ENUM/DNS server 10 overwrites a SIP domain ("exapmle2.ne.jp") included in REGEXP of an acquired ENUM answer to a SIP domain ("stm.exapmle0.ne.jp") indicating that the connection destination is a connection destination via the STM-POI.

Alternatively, for example, when the ENUM/DNS server 10 receives an ENUM query from the ENUM/DNS client 20, the ENUM/DNS server 10 determines that the originating terminal 1 is a test terminal 1a, based on the ENUM query. Then, the ENUM/DNS server 10 overwrites REGEXP of an ENUM answer as follows, for example: "!^.*$!sip:+81422609999@exapmle2.ne.jp;user=phone!"→"!^.*$!sip:+81422609999@exapmle2.ne.jp;user=phone!"

In other words, the ENUM/DNS server 10 overwrites a SIP domain ("exapmle2.ne.jp") included in REGEXP of an acquired ENUM answer to a SIP domain ("exapmle2.ne.jp") indicating that the connection destination is a connection destination via the IP-POI (in this case, substantially, the ENUM/DNS server 10 does not overwrite the SIP domain). Note that the conversion format for SIP domains can be freely configured by the ENUM/DNS server 10, and is not limited to the above conversion format.

Figure 9:
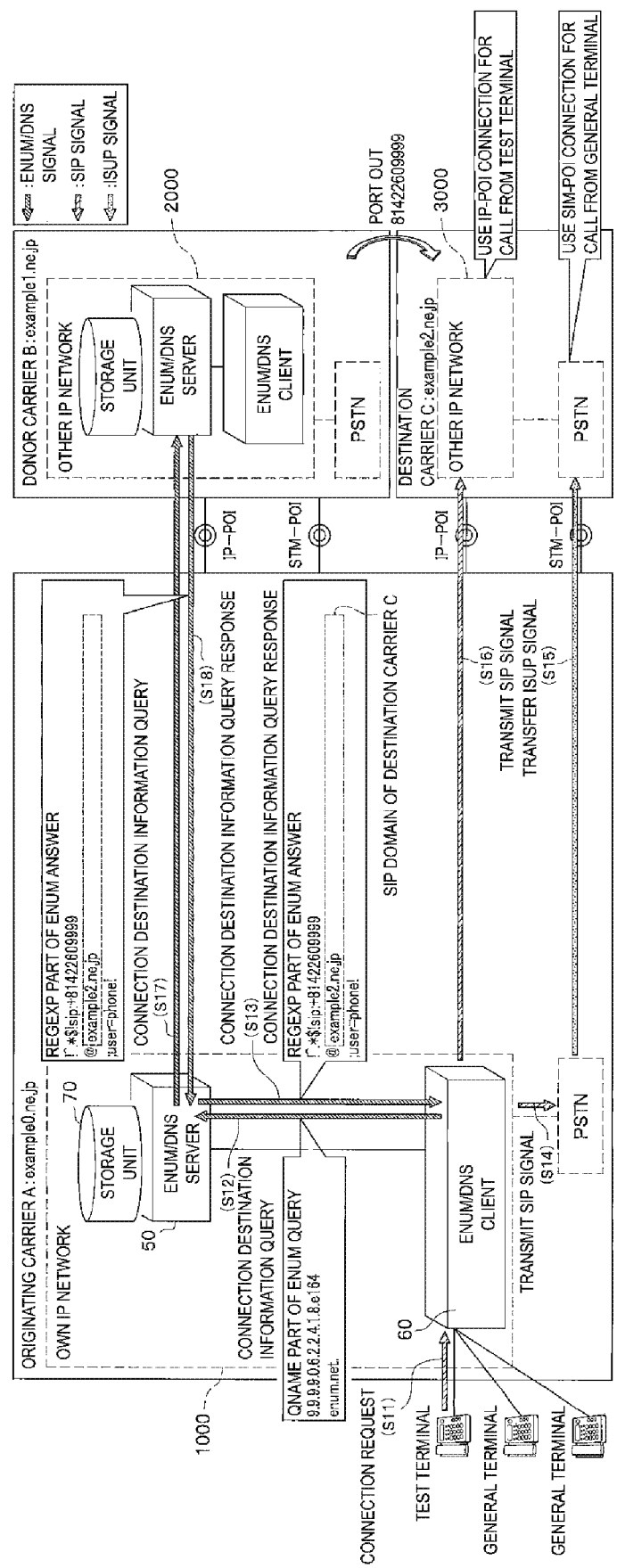
FIG. 9 is a diagram illustrating an overall configuration of a conventional ENUM/DNS system.

As illustrated in FIG. 9, a conventional ENUM/DNS server 50 according to a comparative example, by contrast, transmits the same ENUM answer to an ENUM/DNS client 60 in both of a case where the connection destination is a connection destination via the IP-POI and a case where the connection destination is a connection destination via the STM-POI. For example, when the connection destination is a connection destination via the IP-POI, REGEXP of an ENUM answer transmitted from the ENUM/DNS server 50 to the ENUM/DNS client 60 is "!^.*$sip:+81422609999@exapmle2.ne.jp;user=phone!".

Further, for example, when the connection destination is a connection destination via the STM-POI, REGEXP of an ENUM answer transmitted from the ENUM/DNS server 50 to the ENUM/DNS client 60 is "!^.*$sip:+81422609999@exapmle2.ne.jp;user=phone!".

In other words, in a conventional ENUM/DNS system, the ENUM/DNS server 50 is incapable of transmitting an ENUM answer according to an attribute of the originating terminal 1 to the ENUM/DNS client 60, and thus the ENUM/DNS client 60 by itself determines an attribute of the originating terminal 1 and performs configuration modification for switching connection destinations.

According to the ENUM/DNS system 100 of the first embodiment, the ENUM/DNS server 10 determines an attribute of the originating terminal 1, appropriately converts a SIP domain included in REGEXP of an ENUM answer based on the attribute of the originating terminal 1, and transmits the converted ENUM answer to the ENUM/DNS client 20. Then, the ENUM/DNS client 20 selects a connection destination, based on the converted ENUM answer. Accordingly, the ENUM/DNS clients 20, which have lower performance than the ENUM/DNS servers 10 and are provided more than the number of ENUM/DNS servers 10, no longer need to perform ineffective processing such as the configuration modification (only needs to select a connection destination). Consequently, the ENUM/DNS system 100 with enhanced processing efficiency can be provided.

Note that, in FIG. 1, description is given by taking an example of a case with a single ENUM/DNS server 10 and a single ENUM/DNS client 20 (SIP server). However, the number of these servers is not particularly limited to the above numbers. Further, in the ENUM/DNS system 100, each ENUM/DNS server 10 need not be configured as one apparatus, and the ENUM/DNS server 10 may include different apparatuses for its ENUM/DNS authoritative server and ENUM/DNS cache server.

Detailed description will be given below.
Configuration of ENUM/DNS Server 10

Figure 2:
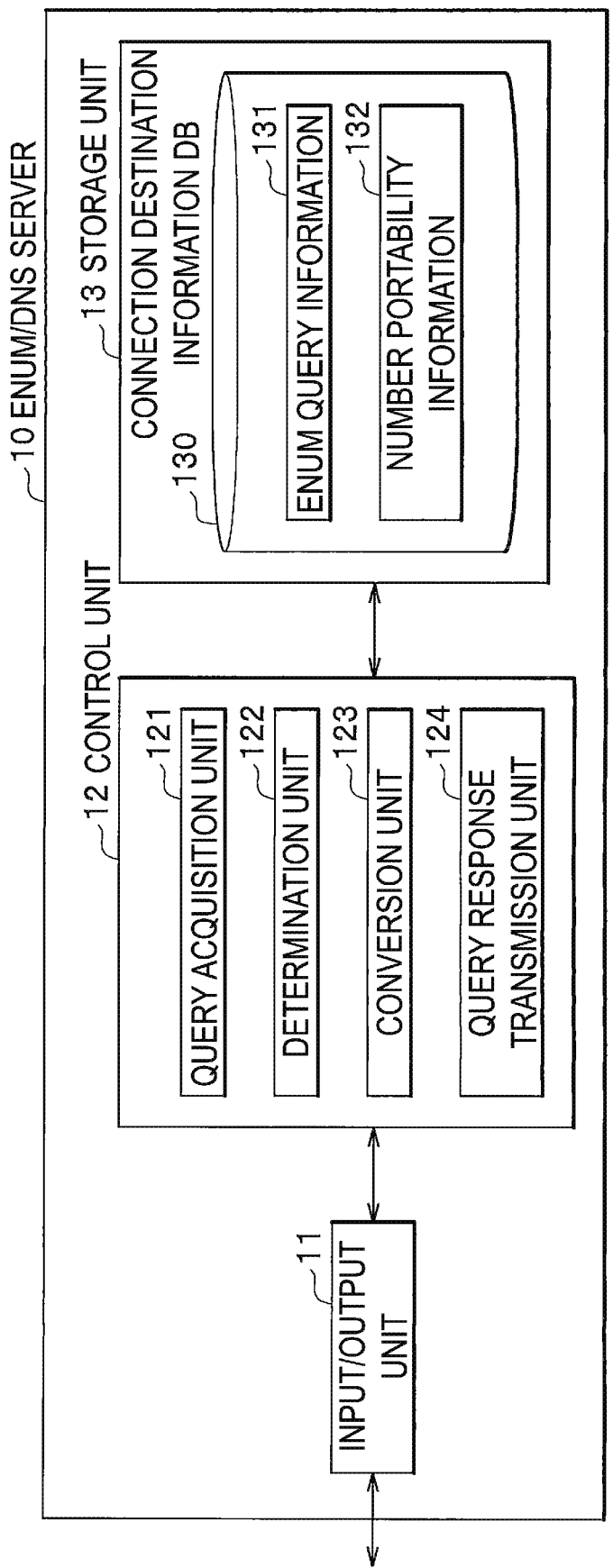
FIG. 2 is a functional block diagram illustrating a configuration example of the ENUM/DNS server according to the first embodiment.

With reference to FIG. 1 to FIG. 4, the ENUM/DNS server 10 according to the first embodiment will be described. FIG. 2 is a functional block diagram illustrating a configuration example of the ENUM/DNS server 10. FIG. 4 is a diagram illustrating a specific example of SIP domain converted in a conversion unit of the ENUM/DNS server 10.

As illustrated in FIG. 2, the ENUM/DNS server 10 includes an input/output unit 11, a control unit 12, and a storage unit 13.

The input/output unit 11 inputs and outputs information to and from another apparatus, for example. Further, the input/output unit 11 transmits and receives information to and from the ENUM/DNS client 20. The input/output unit 11 includes a communication interface for transmitting and receiving information via a communication channel, and an input/output interface for inputting and outputting information to and from an input apparatus such as a keyboard and an output apparatus such as a monitor (not illustrated).

The control unit 12 controls the entire processing executed by the ENUM/DNS server 10, and includes a query acquisition unit 121, a determination unit 122, a conversion unit 123, and a query response transmission unit 124. The control unit 12 is, for example, implemented when a central processing unit (CPU) deploys a program stored in the storage unit 13 in RAM and executes the program.

The query acquisition unit 121 acquires an ENUM query from the ENUM/DNS client 20 via the input/output unit 11, and outputs the acquired ENUM query to the determination unit 122.

The determination unit 122 determines an attribute of the originating terminal 1 based on the ENUM query input from the query acquisition unit 121, and outputs the determination results to the conversion unit 123. Further, the determination unit 122 causes the storage unit 13 to store the determination results indicating the attribute of the originating terminal 1. For example, the determination unit 122 determines whether the originating terminal 1 is a test terminal 1a or the originating terminal 1 is a general terminal 1b, based on an IP address of a connection destination that is associated with the ENUM query input from the query acquisition unit 121. In other words, the determination unit 122 determines that the originating terminal 1 is a test terminal 1a, based on "IP address (A)" of a connection destination that is associated with the ENUM query, and determines that the originating terminal 1 is a general terminal 1b, based on "IP address (B)" of a connection destination that is associated with the ENUM query.

Note that a method in which the determination unit 122 determines the attribute of the originating terminal 1 is not particularly limited to the above method. The determination unit 122 may determine whether the originating terminal 1 is a test terminal 1a or the originating terminal 1 is a general terminal 1b, based on an IP address of the originator. Alternatively, the determination unit 122 may determine whether the originating terminal 1 is a test terminal 1a or the originating terminal 1 is a general terminal 1b, based on a port of the connection destination or a port of the originator. Alternatively, the determination unit 122 may be configured to be capable of determining whether the originating terminal 1 is a test terminal Ta or the originating terminal 1 is a general terminal 1b by referring to a predetermined value that is stored in advance in a field of an extension flag or the like of an ENUM/DNS signal.

The conversion unit 123 acquires an ENUM answer from an ENUM/DNS server 10A of the donor carrier B via the input/output unit 11. Alternatively, the conversion unit 123 extracts connection destination information associated with a destination terminal by referring to a connection destination information DB 130 of its own storage unit 13, and acquires an ENUM answer.

Then, the conversion unit 123 converts a SIP domain included in REGEXP of the acquired ENUM answer to a SIP domain indicating the connection destination based on the determination results input from the determination unit 122, and outputs the ENUM answer including the converted SIP domain to the query response transmission unit 124. Further, the conversion unit 123 causes the storage unit 13 to store such a new ENUM answer.

For example, the conversion unit 123 converts a SIP domain included in REGEXP of the acquired ENUM answer into a SIP domain indicating that the connection destination is a connection destination to be connected via the IP-POI, based on the determination results being produced by the determination unit 122 and indicating that the originating terminal 1 is a test terminal Ta. Then, the conversion unit 123 outputs the newly generated ENUM answer to the query response transmission unit 124.

For example, the conversion unit 123 converts a SIP domain included in REGEXP of the acquired ENUM answer into a SIP domain indicating that the connection destination is a connection destination to be connected via the STM-POI, based on the determination results being produced by the determination unit 122 and indicating that the originating terminal 1 is a general terminal 1b. Then, the conversion unit 123 outputs the newly generated ENUM answer to the query response transmission unit 124.

FIG. 4 illustrates specific examples of SIP domains converted in the conversion unit 123 of the ENUM/DNS server 10. Note that the specific examples illustrated in FIG. 4 are merely examples, and the conversion format for SIP domains converted in the conversion unit 123 of the ENUM/DNS server 10 is not limited to the above conversion format.

For example, when the determination unit 122 determines that the originating terminal 1 is a test terminal Ta and the connection destination is a connection destination to be connected via the IP-POI, the conversion unit 123 converts a SIP domain included in REGEXP of an ENUM answer from "exapmle1.ne.jp" to "exapmle1.ne.jp" (substantially, the conversion unit 123 does not convert the SIP domain).

For example, when the determination unit 122 determines that the originating terminal 1 is a test terminal 1a and the connection destination is a connection destination to be connected via the STM-POI, the conversion unit 123 converts a SIP domain included in REGEXP of an ENUM answer from "exapmle2.ne.jp" to "stm.exapmle0.ne.jp".

For example, when the determination unit 122 determines that the originating terminal 1 is a test terminal 1a and the connection destination is a connection destination to be connected via the STM-POI, the conversion unit 123 converts a SIP domain included in REGEXP of an ENUM answer from "exapmle3.ne.jp" to "stm.exapmle0.ne.jp".

For example, when the determination unit 122 determines that the originating terminal 1 is a general terminal 1b and the connection destination is a connection destination to be connected via the IP-POI, the conversion unit 123 converts a SIP domain included in REGEXP of an ENUM answer from "exapmle1.ne.jp" to "exapmle1.ne.jp" (substantially, the conversion unit 123 does not convert the SIP domain).

For example, when the determination unit 122 determines that the originating terminal 1 is a general terminal 1b and the connection destination is a connection destination to be connected via the IP-POI, the conversion unit 123 converts a SIP domain included in REGEXP of an ENUM answer from "exapmle2.ne.jp" to "exapmle2.ne.jp" (substantially, the conversion unit 123 does not convert the SIP domain).

For example, when the determination unit 122 determines that the originating terminal 1 is a general terminal 1b and the connection destination is a connection destination to be connected via the STM-POI, the conversion unit 123 converts a SIP domain included in REGEXP of an ENUM answer from "exapmle3.ne.jp" to "stm.exapmle0.ne.jp".

The query response transmission unit 124 transmits the ENUM answer input from the conversion unit 123 to the ENUM/DNS client 20 via the input/output unit 11.

For example, when the connection destination is a connection destination to be connected via the STM-POI, the query response transmission unit 124 transmits an ENUM answer with REGEXP of "!^.*$!sip:+81422609999@stm.exapmle0.ne.jp;user=phone!" to the ENUM/DNS client 20.

Subsequently, the ENUM/DNS client 20 selects the connection destination to be connected via the STM-POI, and a SIP signal is transmitted from the ENUM/DNS client 20 to the PSTN of the originating carrier A. Further, an ISUP signal is transferred from the PSTN of the originating carrier A to the PSTN of the destination carrier C.

For example, when the connection destination is a connection destination to be connected via the IP-POI, the query response transmission unit 124 transmits an ENUM answer with REGEXP of "!^.*$!sip:+81422609999@ip.exapmle2.ne.jp;user=phone!" to the ENUM/DNS client 20. Subsequently, the ENUM/DNS client 20 selects the connection destination to be connected via the IP-POI, and a SIP signal is transmitted from the ENUM/DNS client 20 to the IP network of the destination carrier C.

The storage unit 13 includes a hard disk, flash memory, or random access memory (RAM), for example. The storage unit 13 temporarily stores programs for executing each function of the connection destination information DB 130 and the control unit 12, and information necessary for the processing of the control unit 12, for example. The connection destination information DB 130 includes, for example, ENUM query information 131, number portability information 132, etc.

The ENUM query information 131 is information of an IP address of an entity to which a query is transmitted, which is associated with a telephone number range including a telephone number added to an ENUM query. The ENUM query information 131 is managed as a DNS name server (NS) record (name server associated with a domain) and an A record (IP address associated with a name server).

The ENUM query information 131 is, for example, "IP address (A)" of a connection destination of the test terminal 1a, which is associated with 0422-60-9999 represented by a number range including an ENUM query "9.9.9.9.0.6.2.2.4.1.8.e164enum.net.", "IP address (B)" of a connection destination of the general terminal 1b, which is associated with 0422-60-9999 represented by a number range including an ENUM query "9.9.9.9.0.6.2.2.4.1.8.e164enum.net.", or the like.

The number portability information 132 is connection destination information according to a service field value (SIP or PSTN) that is associated with an ENUM query. The number portability information 132 is managed as a DNS naming authority pointer (NAPTR) record. For example, the number portability information 132 is connection destination information "sip:+81422609999@example2.ne.jp;user=phone" according to a service field value (SIP) associated with an ENUM query "9.9.9.9.0.6.2.2.4.1.8.e164enum.net.", connection destination information "sip:+81422609999;npdi;m=+81422589999@example2.ne.jp;user=phone" according to a service field value (PSTN) associated with an ENUM query "9.9.9.9.0.6.2.2.4.1.8.e164enum.net.", or the like.

Note that, regarding the ENUM/DNS server 10 according to the first embodiment, the determination unit 122 and the conversion unit 123 may be provided in the same apparatus as the ENUM/DNS server 10, or may be provided in an apparatus different from the ENUM/DNS server 10.

Configuration of ENUM/DNS Client 20

Figure 3:
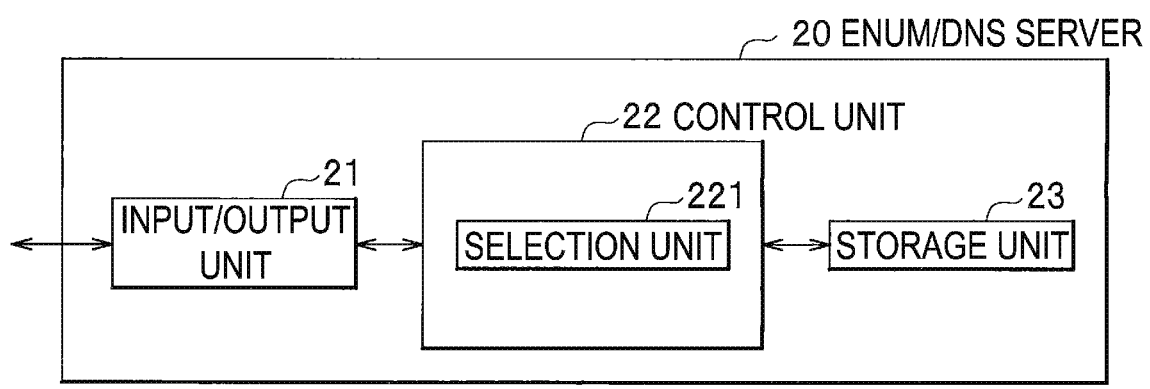
FIG. 3 is a functional block diagram illustrating a configuration example of an ENUM/DNS client according to the first embodiment.

With reference to FIG. 1 and FIG. 3, the ENUM/DNS client 20 according to the first embodiment will be described. FIG. 3 is a functional block diagram illustrating a configuration example of the ENUM/DNS client 20.

The ENUM/DNS client 20 receives a connection request (SIP request) transmitted from the originating terminal 1 (the test terminal Ta, the general terminal 1b, or the general terminal 1c) to a destination terminal. Further, the ENUM/DNS client 20 transmits, to the ENUM/DNS server 10, an ENUM query that indicates a connection destination associated with a telephone number of the destination terminal added to the connection request.

Further, the ENUM/DNS client 20 receives an ENUM answer from the ENUM/DNS server 10.

Further, the ENUM/DNS client 20 transmits a SIP signal to a predetermined connection destination, based on the received ENUM answer.

The ENUM/DNS client 20 includes an input/output unit 21, a control unit 22, and a storage unit 23.

The input/output unit 21 inputs and outputs information to and from another apparatus, for example. Further, the input/output unit 21 transmits and receives information to and from the originating terminal 1 and the ENUM/DNS server 10, for example. The input/output unit 21 includes a communication interface for transmitting and receiving information via a communication channel, and an input/output interface for inputting and outputting information to and from an input apparatus such as a keyboard and an output apparatus such as a monitor (not illustrated).

The storage unit 23 includes a hard disk, flash memory, or RAM, for example. The storage unit 23 temporarily stores programs for executing each function of the control unit, and information necessary for the processing of the control unit 22, for example.

The control unit 22 controls the entire processing executed by the ENUM/DNS client 20, and includes a selection unit 221. The control unit 22 is, for example, implemented when a CPU deploys a program stored in the storage unit 23 in the RAM and executes the program.

The selection unit 221 selects a connection destination, based on a SIP domain input from the ENUM/DNS server 10.

For example, when the selection unit 221 receives an ENUM answer having a SIP domain included in REGEXP of the ENUM answer being converted to "stm.exapmle0.ne.jp" by the conversion unit 123 of the ENUM/DNS server 10 and hence having the REGEXP of "!^.*$!sip:+81422609999@stm.exapmle0.ne.jp; user=phone!", the selection unit 221 selects a connection destination to be connected via the STM-POI as the connection destination.

For example, when the selection unit 221 receives an ENUM answer having a SIP domain included in REGEXP of the ENUM answer being converted to "exapmle2.ne.jp" by the conversion unit 123 of the ENUM/DNS server 10 and hence having the REGEXP of "!^.*$!sip:+81422609999@exapmle2.ne.jp;user=phone!", the selection unit 221 selects a connection destination to be connected via the IP-POI as the connection destination.

The configuration that the ENUM/DNS client 20 includes the selection unit 221 as described above enables the ENUM/DNS client 20 to select a connection destination, based on an ENUM answer that is appropriately converted by the ENUM/DNS server 10 in advance. In other words, the configuration enables the ENUM/DNS client 20 to appropriately select a connection destination as follows, for example: the ENUM/DNS client 20 selects a connection destination via the IP-POI as a connection destination of a test terminal, or the ENUM/DNS client 20 selects a connection destination via the STM-POI as a connection destination of a general terminal. Accordingly, the ENUM/DNS client no longer needs to perform configuration modification as in the conventional technology, which involves a procedure in which the ENUM/DNS client first switches connection of only a test terminal to connection via the IP-POI, and on the condition that there is no problem observed, the ENUM/DNS client then sequentially switches connection of general terminals to connection via the IP-POI, for example. Consequently, processing time can be reduced.

According to the ENUM/DNS system 100 of the first embodiment, the ENUM/DNS server 10 determines an attribute of the originating terminal 1, converts a SIP domain included in REGEXP of an ENUM answer based on the attribute of the originating terminal 1, and transmits the converted ENUM answer to the ENUM/DNS client 20. Accordingly, the ENUM/DNS clients 20, which have lower performance than the ENUM/DNS servers 10 and are provided more than the number of ENUM/DNS servers 10, no longer need to perform ineffective processing such as the configuration modification. Consequently, the ENUM/DNS system 100 with enhanced processing efficiency can be provided.

Operation of ENUM/DNS System 100

Figure 5:
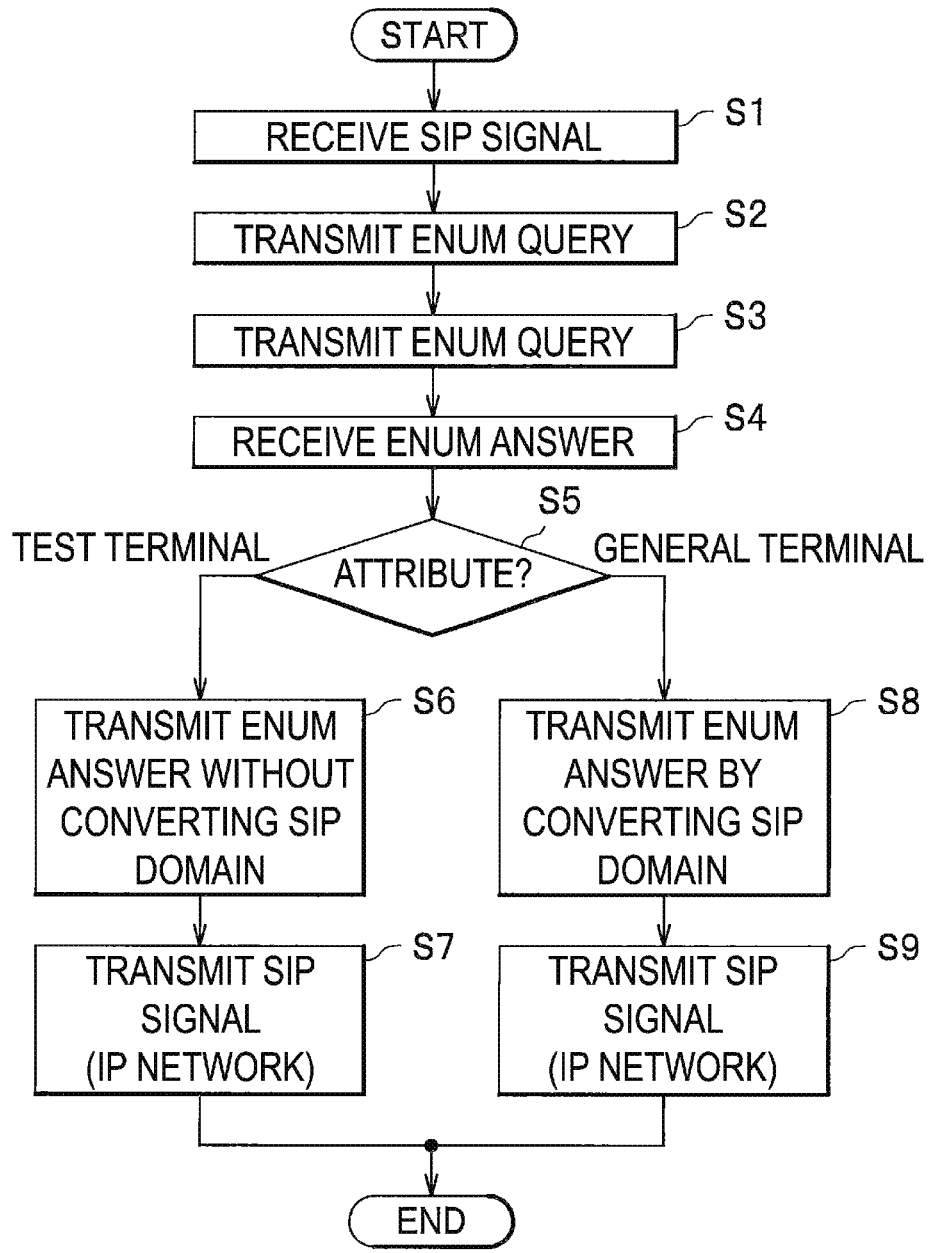
FIG. 5 is a flowchart illustrating a sequence of operations of processing of the ENUM/DNS system according to the first embodiment.

Next, with reference to FIG. 1 and FIG. 5, operation of the ENUM/DNS system 100 according to the first embodiment will be described. FIG. 5 is a flowchart illustrating a sequence of operations of processing of the ENUM/DNS system 100 according to the first embodiment. Note that, in FIG. 5, description will be given by taking an example in which the test terminal 1a is connected to a connection destination via the IP-POI and the general terminal 1b is connected to a connection destination via the STM-POI.

In Step S1, the ENUM/DNS client 20 receives a SIP signal from the originating terminal 1 (the test terminal 1a or the general terminal 1b).

In Step S2, the ENUM/DNS client 20 performs a query to the ENUM/DNS server 10 about connection destination information (such as a URI associated with a destination telephone number) to connect to the destination carrier C. In this case, the query is transmitted from the ENUM/DNS client 20 to the ENUM/DNS server 10, with QNAME of the ENUM query being "9.9.9.9.0.6.2.2.4.1.8.e164enum.net.".

In Step S3, when the ENUM/DNS server 10 receives the ENUM query, the ENUM/DNS server 10 refers to its own storage unit and determines whether or not connection destination information to connect to the destination carrier C is stored. When the ENUM/DNS server 10 determines that its own storage unit does not store the connection destination information to connect to the destination carrier C, the ENUM/DNS server 10 performs a query to the ENUM/DNS server 10A of the donor carrier B about connection destination information to connect to the destination carrier C. In this case, the query is transmitted from the ENUM/DNS server 10 of the originating carrier A to the ENUM/DNS server 10A of the donor carrier B, with QNAME of the ENUM query being "9.9.9.9.0.6.2.2.4.1.8.e164enum.net.".

In Step S4, the ENUM/DNS server 10 receives an ENUM answer from the ENUM/DNS server 10A of the donor carrier B. In this case, the ENUM answer is transmitted from the ENUM/DNS server 10A of the donor carrier B to the ENUM/DNS server 10 of the originating carrier A, with REGEXP of the ENUM answer being "!^.*$!sip:+81422609999@exapmle2.ne.jp;user=phone!".

In Step S5, the ENUM/DNS server 10 determines an attribute of the originating terminal 1 (the test terminal 1a or the general terminal 1b). For example, the ENUM/DNS server 10 determines that the originating terminal 1 is a test terminal Ta, based on an IP address (for example, "IP address (A)") of a connection destination that is associated with the ENUM query described above. For example, the ENUM/DNS server 10 determines that the originating terminal 1 is a general terminal 1b, based on an IP address (for example, "IP address (B)") of a connection destination that is associated with the ENUM query described above.

When the ENUM/DNS server 10 determines that an originating terminal 1X is a test terminal Ta, the ENUM/DNS server 10 performs the processing of Step S6. In contrast, when the ENUM/DNS server 10 determines that an originating terminal 1Y is a general terminal 1b, the ENUM/DNS server 10 performs the processing of Step S8.

In Step S6, when the ENUM/DNS server 10 determines that the originating terminal 1 is a test terminal Ta, the ENUM/DNS server 10 confirms the ENUM answer without converting a SIP domain included in the REGEXP of the ENUM answer, and transmits the ENUM answer to the ENUM/DNS client 20. Here, the ENUM answer is transmitted from the ENUM/DNS server 10 to the ENUM/DNS client 20, with the REGEXP of the ENUM answer being "!^.*$!sip:+81422609999@exapmle2.ne.jp;user=phone!".

In Step S7, the ENUM/DNS client 20 transmits a SIP signal to the IP network of the destination carrier C via the IP-POI.

In Step S8, when the ENUM/DNS server 10 determines that the originating terminal 1 is a general terminal 1b, the ENUM/DNS server 10 confirms the ENUM answer by converting a SIP domain included in the REGEXP of the ENUM answer, and transmits the ENUM answer to the ENUM/DNS client 20. In this case, the ENUM answer is transmitted from the ENUM/DNS server 10 to the ENUM/DNS client 20, with the REGEXP of the ENUM answer being "!^.*$ !sip:+81422609999@stm.exapmle0.ne.jp; user=phone!".

In Step S9, the ENUM/DNS client 20 transmits a SIP signal to the PSTN of the originating carrier A. After that, an ISUP signal is transferred from the PSTN of the originating carrier A to the PSTN of the destination carrier C via the STM-POI.

As described above, according to the ENUM/DNS system 100 of the first embodiment, when the originating terminal is a test terminal, the ENUM/DNS server 10 converts a SIP domain included in REGEXP of an ENUM answer to a SIP domain indicating that the connection destination is a connection destination to be connected via the IP-POI. Further, when the originating terminal is a general terminal, the ENUM/DNS server 10 converts a SIP domain included in REGEXP of an ENUM answer to a SIP domain indicating that the connection destination is a connection destination to be connected via the STM-POI. Accordingly, the ENUM/DNS client 20 no longer needs to perform configuration modification as in the conventional technology, which involves a procedure in which the ENUM/DNS client 20 first switches connection of only the test terminal Ta to connection via the IP-POI, and on the condition that there is no problem observed, the ENUM/DNS client 20 then sequentially switches connection of the general terminals 1b to connection via the IP-POI, for example. Consequently, the ENUM/DNS system 100 with enhanced processing efficiency can be provided.

Second Embodiment

Configuration of ENUM/DNS System

Figure 6:
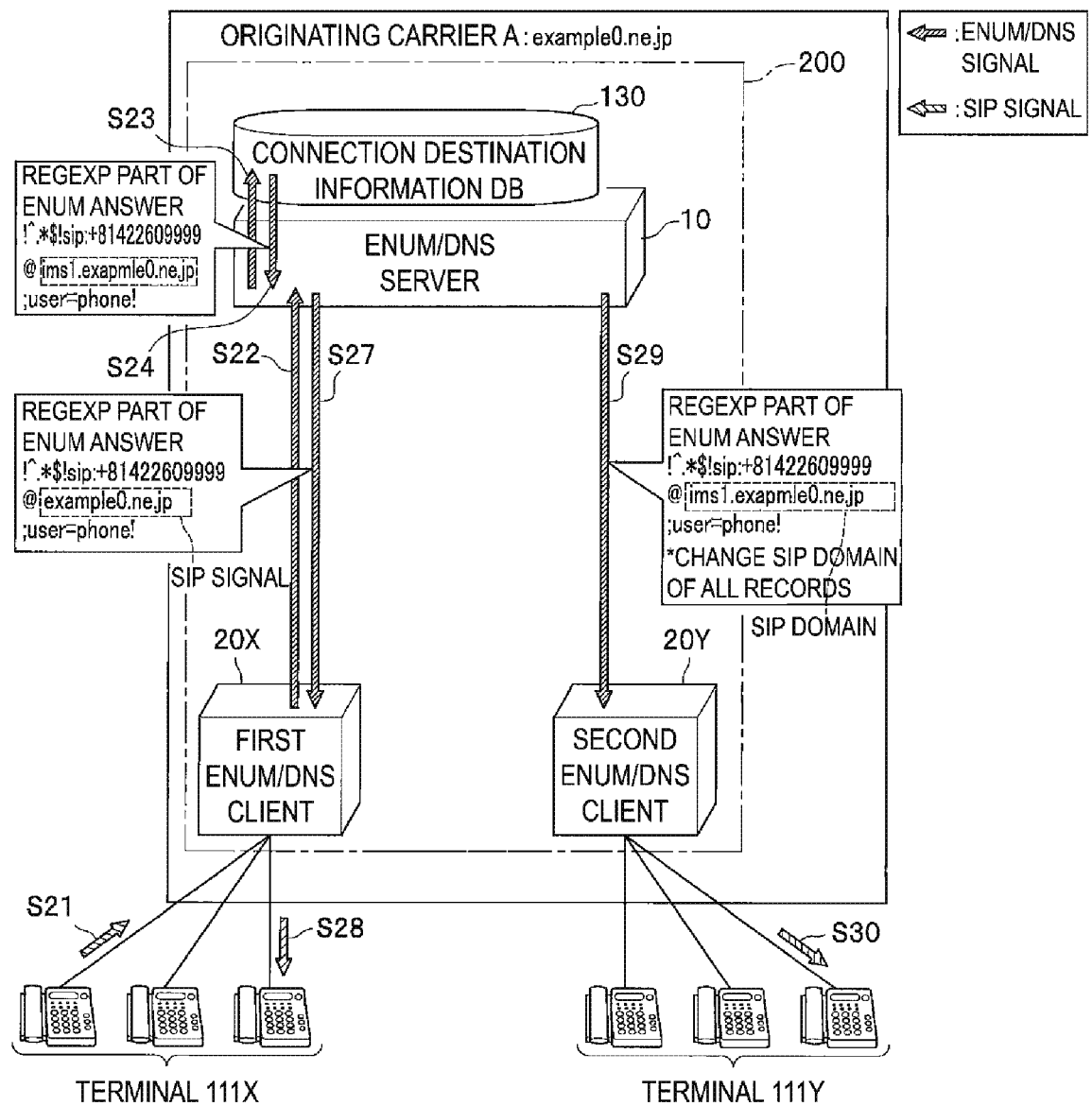
FIG. 6 is a diagram illustrating an overall configuration of an ENUM/DNS system according to a second embodiment.
Figure 7:
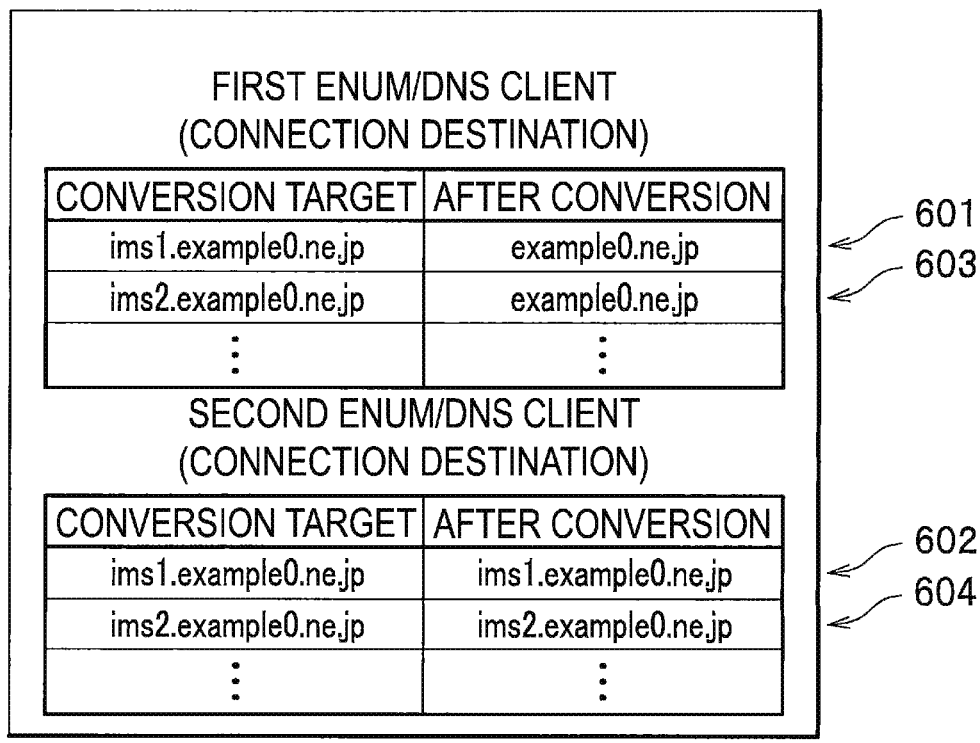
FIG. 7 is a diagram illustrating specific examples of SIP domains converted in a conversion unit of an ENUM/DNS server according to the second embodiment.

Next, with reference to FIG. 6 and FIG. 7, an ENUM/DNS system 200 according to the second embodiment will be described. FIG. 6 is a diagram illustrating an overall configuration of the ENUM/DNS system 200 according to the second embodiment. FIG. 7 is a diagram illustrating specific examples of SIP domains converted in the conversion unit of the ENUM/DNS server 10 according to the second embodiment. Note that, in the second embodiment, redundant description will not be given for a part common to the above-described first embodiment.

As illustrated in FIG. 6, the ENUM/DNS system 200 according to the second embodiment includes ENUM/DNS clients 20 (a first ENUM/DNS client 20X and a second ENUM/DNS client 20Y) that each perform a connection destination information query that indicates a connection destination associated with a telephone number of a destination terminal added to a connection request (SIP request) transmitted by an originating terminal, and an ENUM/DNS server 10 that receives the connection destination information query (ENUM query) from the ENUM/DNS clients 20 (the first ENUM/DNS client 20X and the second ENUM/DNS client 20Y) and outputs the connection destination as a connection destination information query response (ENUM answer).

The ENUM/DNS system 200 according to the second embodiment has a feature in that the ENUM/DNS server 10 (the first ENUM/DNS client 20X and the second ENUM/DNS client 20Y) determines an attribute of the originating terminal based on the connection destination information query, and converts a SIP domain included in REGEXP of the connection destination information query response to a SIP domain indicating the connection destination based on the attribute of the originating terminal. Another feature is that the ENUM/DNS clients 20 (the first ENUM/DNS client 20X and the second ENUM/DNS client 20Y) select the connection destination, based on the converted SIP domain. Note that, in the ENUM/DNS system 200 according to the second embodiment, using the first ENUM/DNS client 20X as a connection destination or using the second ENUM/DNS client 20Y as a connection destination is merely an example, and the connection destination is not limited to the above connection destinations.

The configuration of the ENUM/DNS server 10 according to the second embodiment is the same as the configuration of the ENUM/DNS server 10 according to the first embodiment, and the configuration of each of the first ENUM/DNS client 20X and the second ENUM/DNS client 20Y according to the second embodiment is the same as the configuration of the ENUM/DNS client 20 according to the first embodiment.

One configuration of the ENUM/DNS system 200 according to the second embodiment that differs from the ENUM/DNS system 100 according to the first embodiment is as follows: the originating terminal determines whether the originating terminal is a terminal accommodated in the first ENUM/DNS client 20X or the originating terminal is a terminal accommodated in the second ENUM/DNS client 20Y, instead of the configuration that the ENUM/DNS client 20 determines whether the originating terminal is a test terminal or the originating terminal is a general terminal.

Another configuration of the ENUM/DNS system 200 according to the second embodiment that differs from the ENUM/DNS system 100 according to the first embodiment is as follows: when the ENUM/DNS server 10 receives an ENUM query from the first ENUM/DNS client 20X and the connection destination is the first ENUM/DNS client 20X, the ENUM/DNS server 10 converts a SIP domain included in REGEXP of an ENUM answer to a SIP domain indicating that the connection destination is the first ENUM/DNS client 20X, whereas when the ENUM/DNS server 10 receives an ENUM query from the first ENUM/DNS client 20X and the connection destination is the second ENUM/DNS client 20Y, the ENUM/DNS server 10 converts a SIP domain included in REGEXP of an ENUM answer to a SIP domain indicating that the connection destination is the second ENUM/DNS client 20Y.

Another configuration of the ENUM/DNS system 200 according to the second embodiment that differs from the ENUM/DNS system 100 according to the first embodiment is as follows: when the ENUM/DNS server 10 receives an ENUM query from the second ENUM/DNS client 20Y and the connection destination is the first ENUM/DNS client 20X, the ENUM/DNS server 10 converts a SIP domain included in REGEXP of an ENUM answer to a SIP domain indicating that the connection destination is the first ENUM/DNS client 20X, whereas when the ENUM/DNS server 10 receives an ENUM query from the second ENUM/DNS client 20Y and the connection destination is the second ENUM/DNS client 20Y, the ENUM/DNS server 10 converts a SIP domain included in REGEXP of an ENUM answer to a SIP domain indicating that the connection destination is the second ENUM/DNS client 20Y.

For example, when the ENUM/DNS server 10 receives an ENUM query from the first ENUM/DNS client 20X, the ENUM/DNS server 10 determines that the originating terminal is a terminal 111X accommodated in the first ENUM/DNS client 20X, based on the ENUM query.

Then, when the connection destination is the first ENUM/DNS client 20X, the ENUM/DNS server 10 overwrites REGEXP of an ENUM answer as follows: "!^.*$!sip:+81422609999@ims1.exapmle0.ne.jp;user=phone!"→"!^.*$!sip:+81422609999@exapmle0.ne.jp;user=phone!"

In other words, the ENUM/DNS server 10 converts a SIP domain ("ims1.exapmle0.ne.jp") included in REGEXP of an ENUM answer to a SIP domain ("exapmle0.ne.jp") indicating that the connection destination is the first ENUM/DNS client 20X (in this case, substantially, the ENUM/DNS server 10 overwrites the SIP domain).

For example, when the ENUM/DNS server 10 receives an ENUM query from the first ENUM/DNS client 20X, the ENUM/DNS server 10 determines that the originating terminal is a terminal 111X accommodated in the first ENUM/DNS client 20X, based on the ENUM query. Then, when the connection destination is the second ENUM/DNS client 20Y, the ENUM/DNS server 10 overwrites REGEXP of an ENUM answer as follows: "!^.$sip:+81422609999@ims1.exapmle0.ne.jp;user=phone!"→"!^.*$!sip:+81422609999@ims1.exapmle0.ne.jp;user=phone!"

In other words, the ENUM/DNS server 10 converts a SIP domain ("ims1.exapmle0.ne.jp") included in REGEXP of an ENUM answer to a SIP domain ("ims.exapmle0.ne.jp") indicating that the connection destination is the second ENUM/DNS client 20Y (in this case, substantially, the ENUM/DNS server 10 does not overwrite the SIP domain).

With reference to FIG. 7, specific examples of SIP domains converted in the conversion unit 123 of the ENUM/DNS server 10 are described below. Note that the specific examples illustrated in FIG. 7 are merely examples, and the conversion format for SIP domains converted in the conversion unit 123 of the ENUM/DNS server 10 is not limited to the above conversion format.

For example, when the determination unit 122 determines that the originating terminal is a terminal 111X accommodated in the first ENUM/DNS client 20X and the connection destination is the first ENUM/DNS client 20X, the conversion unit 123 converts a SIP domain included in REGEXP of an ENUM answer from "ims1.exapmle0.ne.jp" to "exapmle0.ne.jp" as illustrated in a specific example 601 of FIG. 7.

For example, when the determination unit 122 determines that the originating terminal is a terminal 111X accommodated in the first ENUM/DNS client 20X and the connection destination is the second ENUM/DNS client 20Y, the conversion unit 123 converts a SIP domain included in REGEXP of an ENUM answer from "ims1.exapmle0.ne.jp" to "ims1.exapmle0.ne.jp" as illustrated in a specific example 602 of FIG. 7 (substantially, the conversion unit 123 does not convert the SIP domain).

For example, when the determination unit 122 determines that the originating terminal is a terminal 111Y accommodated in the second ENUM/DNS client 20Y and the connection destination is the first ENUM/DNS client 20X, the conversion unit 123 converts a SIP domain included in REGEXP of an ENUM answer from "ims2.exapmle0.ne.jp" to "exapmle0.ne.jp" as illustrated in a specific example 603 of FIG. 7.

For example, when the determination unit 122 determines that the originating terminal is a terminal 111Y accommodated in the second ENUM/DNS client 20Y and the connection destination is the second ENUM/DNS client 20Y, the conversion unit 123 converts a SIP domain included in REGEXP of an ENUM answer from "ims2.exapmle0.ne.jp" to "ims2.exapmle0.ne.jp" as illustrated in a specific example 604 of FIG. 7 (substantially, the conversion unit 123 does not convert the SIP domain).

Note that, for example, the ENUM/DNS server 10 can convert a SIP domain included in REGEXP of an ENUM answer, based on an entity from which an ENUM answer is acquired. Examples of such operation include one that the ENUM/DNS server 10 does not add a subdomain to a SIP domain included in REGEXP of an ENUM answer if the ENUM answer is acquired from an ENUM/DNS server of another company (substantially, the ENUM/DNS server 10 does not convert the SIP domain), and one that the ENUM/DNS server 10 adds a subdomain to a SIP domain included in REGEXP of an ENUM answer if the ENUM answer is acquired from an ENUM/DNS server of its own company (substantially, the ENUM/DNS server 10 converts the SIP domain). In other words, the above specific examples are merely examples, and the ENUM/DNS server 10 can freely convert a SIP domain included in REGEXP of an ENUM answer in accordance with a predetermined rule.

According to the ENUM/DNS system 200 of the present embodiment, the ENUM/DNS server 10 determines an attribute of an originating terminal, converts a SIP domain included in REGEXP of an ENUM answer based on the attribute of the originating terminal, and transmits the converted SIP domain to the ENUM/DNS client 20 (the first ENUM/DNS client 20X or the second ENUM/DNS client 20Y). Accordingly, the ENUM/DNS client 20 (the first ENUM/DNS client 20X or the second ENUM/DNS client 20Y) no longer needs to perform configuration modification every time the ENUM/DNS client 20 is connected, depending on connection with a terminal accommodated in the first ENUM/DNS client 20X or connection with a terminal accommodated in the second ENUM/DNS client 20Y, as in the conventional technology. Consequently, the ENUM/DNS system 200 with enhanced processing efficiency can be provided.

Operation of ENUM/DNS System 200

Figure 8:
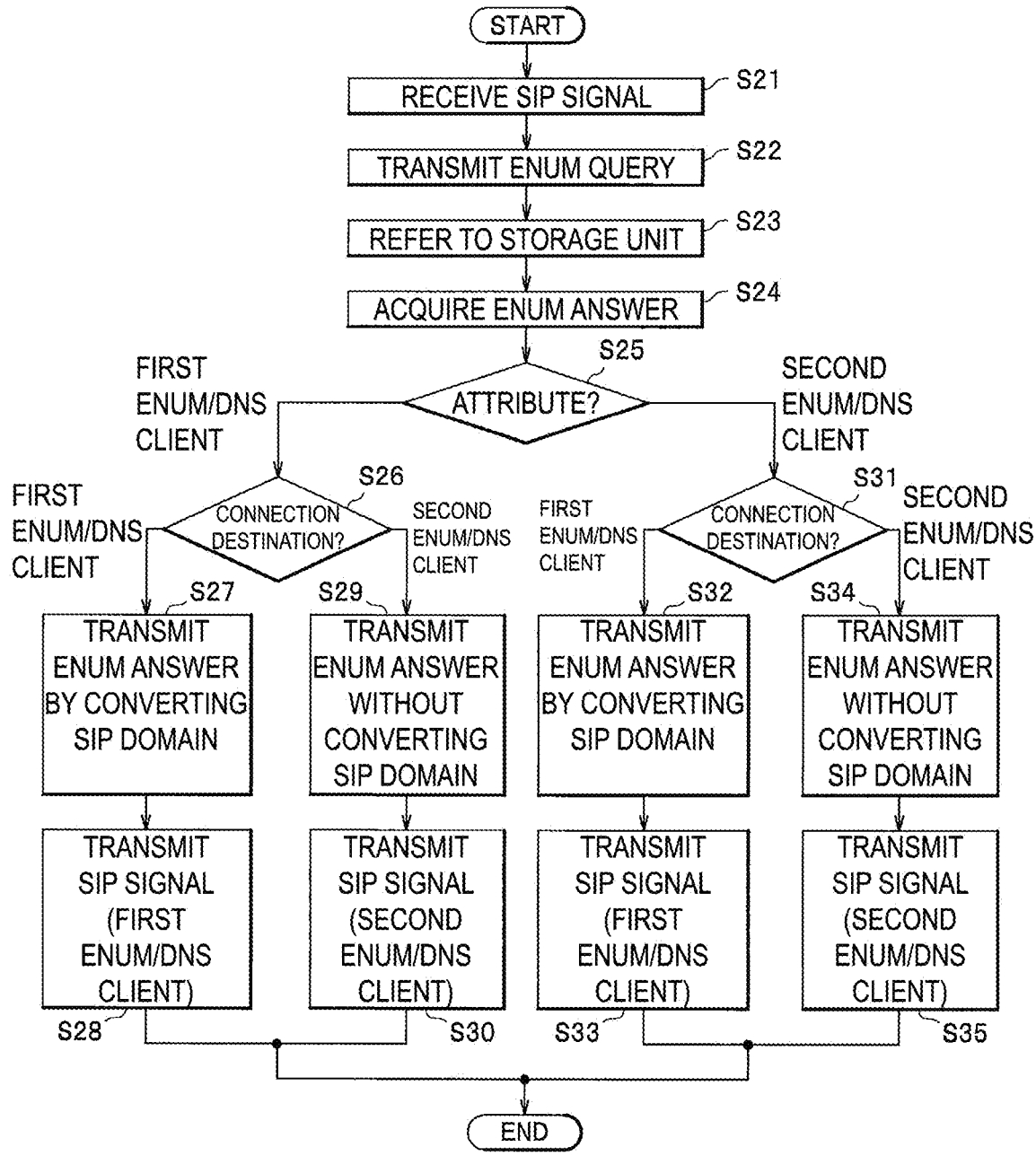
FIG. 8 is a flowchart illustrating a sequence of operations of processing of the ENUM/DNS system according to the second embodiment.

Next, with reference to FIG. 6 and FIG. 8, operation of the ENUM/DNS system 200 according to the second embodiment will be described. FIG. 8 is a flowchart illustrating a sequence of operations of processing of the ENUM/DNS system 200 according to the second embodiment. Note that, in the second embodiment, description will be given by taking an example in which the originating terminal 1 is a terminal 111X accommodated in the first ENUM/DNS client 20X or a terminal 111Y accommodated in the second ENUM/DNS client 20Y, and the connection destination is a terminal 111X accommodated in the first ENUM/DNS client 20X or a terminal 111Y accommodated in the second ENUM/DNS client 20Y.

In Step S21, the ENUM/DNS client 20 (the first ENUM/DNS client 20X or the second ENUM/DNS client 20Y) receives a SIP signal from an originating terminal.

In Step S22, the ENUM/DNS client 20 (the first ENUM/DNS client 20X or the second ENUM/DNS client 20Y) performs a query to the ENUM/DNS server 10 about connection destination information (such as a URI associated with a destination telephone number) indicating a connection destination associated with a telephone number of a destination terminal. In this case, the query is transmitted from the ENUM/DNS client 20 (the first ENUM/DNS client 20X or the second ENUM/DNS client 20Y) to the ENUM/DNS server 10, with QNAME of the ENUM query being "9.9.9.9.0.6.2.2.4.1.8.e164enum.net.".

In Step S23, when the ENUM/DNS server 10 receives the ENUM query, the ENUM/DNS server 10 refers to its own storage unit and determines whether or not connection destination information indicating a connection destination associated with the telephone number of the destination terminal is stored.

In Step S24, when the ENUM/DNS server 10 determines that its own storage unit stores the connection destination information indicating a connection destination associated with the telephone number of the destination terminal, the ENUM/DNS server 10 extracts the connection destination information from its own storage unit and acquires an ENUM answer. In this case, the ENUM answer is acquired by the ENUM/DNS server 10, with REGEXP of the ENUM answer being "!^.*$!sip:+81422609999@ims1.exapmle0.ne.jp;user=phone!".

In Step S25, the ENUM/DNS server 10 determines an attribute of the originating terminal. For example, the ENUM/DNS server 10 determines that the originating terminal is a terminal 111X accommodated in the first ENUM/DNS client 20X, based on an IP address of a connection destination that is associated with the ENUM query described above. Alternatively, for example, the ENUM/DNS server 10 determines that the originating terminal is a terminal 111Y accommodated in the second ENUM/DNS client 20Y, based on an IP address of a connection destination that is associated with the ENUM query described above.

In this case, when the ENUM/DNS server 10 determines that the originating terminal is a terminal 111X accommodated in the first ENUM/DNS client 20X, the ENUM/DNS server 10 performs the processing of Step S26. In contrast, when the ENUM/DNS server 10 determines that the originating terminal is a terminal 111Y accommodated in the second ENUM/DNS client 20Y, the ENUM/DNS server 10 performs the processing of Step S31.

In Step S26, when the ENUM/DNS server 10 determines that the originating terminal is a terminal 111X accommodated in the first ENUM/DNS client 20X, the ENUM/DNS server 10 further determines whether the connection destination is a terminal 111X accommodated in the first ENUM/DNS client 20X or a terminal 111Y accommodated in the second ENUM/DNS client 20Y.

When the ENUM/DNS server 10 determines that the connection destination is a terminal 111X accommodated in the first ENUM/DNS client 20X, the ENUM/DNS server 10 performs the processing of Step S27. In contrast, when the ENUM/DNS server 10 determines that the connection destination is a terminal 111Y accommodated in the second ENUM/DNS client 20Y, the ENUM/DNS server 10 performs the processing of Step S29.

In Step S27, when the ENUM/DNS server 10 determines that the connection destination is a terminal 111X accommodated in the first ENUM/DNS client 20X, the ENUM/DNS server 10 confirms the ENUM answer by converting a SIP domain included in the REGEXP of the ENUM answer, and transmits the ENUM answer to the first ENUM/DNS client 20X. In this case, the ENUM answer is transmitted from the ENUM/DNS server 10 to the first ENUM/DNS client 20X, with the REGEXP of the ENUM answer being converted from "!^.*$!sip:+81422609999@ims1.exapmle0.ne.jp;user=phone!" to "!^.*$!sip:+81422609999@exapmle0.ne.jp;user=phone!".

In Step S28, the first ENUM/DNS client 20X transmits a SIP signal to the terminal 111X that the first ENUM/DNS client 20X accommodates.

In Step S29, when the ENUM/DNS server 10 determines that the connection destination is a terminal 111Y accommodated in the second ENUM/DNS client 20Y, the ENUM/DNS server 10 confirms the ENUM answer without converting a SIP domain included in the REGEXP of the ENUM answer, and transmits the ENUM answer to the second ENUM/DNS client 20Y. In this case, the ENUM answer is transmitted from the ENUM/DNS server 10 to the second ENUM/DNS client 20Y, with the REGEXP of the ENUM answer being "!^.*$!sip:+81422609999@ims1.exapmle0.ne.jp;user=phone!".

In Step S30, the second ENUM/DNS client 20Y transmits a SIP signal to the terminal 111Y that the second ENUM/DNS client 20Y accommodates.

In Step S31, when the ENUM/DNS server 10 determines that the originating terminal is a terminal 1Y accommodated in the second ENUM/DNS client 20Y, the ENUM/DNS server 10 further determines whether the connection destination is a terminal 111X accommodated in the first ENUM/DNS client 20X or a terminal 111Y accommodated in the second ENUM/DNS client 20Y.

When the ENUM/DNS server 10 determines that the connection destination is a terminal 111X accommodated in the first ENUM/DNS client 20X, the ENUM/DNS server 10 performs the processing of Step S32. When the ENUM/DNS server 10 determines that the connection destination is a terminal 111Y accommodated in the second ENUM/DNS client 20Y, the ENUM/DNS server 10 performs the processing of Step S34.

In Step S32, when the ENUM/DNS server 10 determines that the connection destination is a terminal 111X accommodated in the first ENUM/DNS client 20X, the ENUM/DNS server 10 confirms the ENUM answer by converting a SIP domain included in the REGEXP of the ENUM answer, and transmits the ENUM answer to the first ENUM/DNS client 20X. In this case, the ENUM answer is transmitted from the ENUM/DNS server 10 to the first ENUM/DNS client 20X, with the REGEXP of the ENUM answer being converted from "!^.*$!sip:+81422609999@ims2.exapmle0.ne.jp;user=phone!" to "!^.*$!sip:+81422609999@exapmle0.ne.jp;user=phone!".

In Step S33, the first ENUM/DNS client 20X transmits a SIP signal to the terminal 111X that the first ENUM/DNS client 20X accommodates.

In Step S34, when the ENUM/DNS server 10 determines that the connection destination is a terminal 111Y accommodated in the second ENUM/DNS client 20Y, the ENUM/DNS server 10 confirms the ENUM answer without converting a SIP domain included in the REGEXP of the ENUM answer, and transmits the ENUM answer to the second ENUM/DNS client 20Y. In this case, the ENUM answer is transmitted from the ENUM/DNS server 10 to the second ENUM/DNS client 20Y, with the REGEXP of the ENUM answer being "!^.*$!sip:+81422609999@ims2.exapmle0.ne.jp;user=phone!".

In Step S35, the second ENUM/DNS client 20Y transmits a SIP signal to the terminal 111Y that the second ENUM/DNS client 20Y accommodates.

As described above, the ENUM/DNS system 200 of the present embodiment enables the following operation: when the originating terminal is a terminal accommodated by the first ENUM/DNS client and the connection destination is a terminal accommodated by the first ENUM/DNS client, the ENUM/DNS server 10 converts a SIP domain included in REGEXP of an ENUM answer (substantially, the ENUM/DNS server 10 overwrites the SIP domain), whereas when the originating terminal is a terminal accommodated by the first ENUM/DNS client and the connection destination is a terminal accommodated by the second ENUM/DNS client, the ENUM/DNS server 10 does not convert a SIP domain included in REGEXP of an ENUM answer (substantially, the ENUM/DNS server 10 does not overwrite the SIP domain). Consequently, the ENUM/DNS system 200 with enhanced processing efficiency can be provided.

REFERENCE SIGNS LIST

1 Originating terminal
10 ENUM/DNS server
20 ENUM/DNS client
20X First ENUM/DNS client
20Y Second ENUM/DNS client
100, 200 ENUM/DNS system
122 Determination unit
123 Conversion unit
221 Selection unit

The invention claimed is:

1. An E.164 Number Mapping (ENUM)/Domain Name System (DNS) server using an E.164 standard for receiving, from an ENUM/DNS client, a connection destination information query indicating a connection destination associated with a telephone number of a destination terminal added to a connection request transmitted by an originating terminal and outputting the connection destination as a connection destination information response, the ENUM/DNS server comprising:
one or more processors configured to
determine an attribute of the originating terminal, based on the connection destination information query, wherein determining the attribute of the originating terminal comprises determining whether the originating terminal is a test terminal or a general terminal; and
acquire the connection destination information response comprising connection destination information associated with the destination terminal, wherein the connection destination information response comprises a first Session Initiation Protocol (SIP) domain, and
i) in response to determining that the originating terminal is the test terminal, convert the first SIP domain included in REGEXP of the connection destination information response to a second SIP domain indicating that the connection destination is a connection destination to be connected via an Internet Protocol (IP)-Point Of Interface (POI), and
ii) in response to determining that the originating terminal is the general terminal, convert the first SIP domain included in the REGEXP of the connection destination information response to a third SIP domain indicating that the connection destination is a connection destination to be connected via either the IP-POI or an Synchronous Transfer Mode (STM)-POI.

2. The ENUM/DNS server according to claim 1, wherein the one or more processors are configured to determine whether the originating terminal is a terminal accommodated by a first ENUM/DNS client or a terminal accommodated by a second ENUM/DNS client, based on the connection destination information query; and when determining that the originating terminal is the terminal accommodated by the first ENUM/DNS client, convert the first SIP domain included in the REGEXP of the connection destination information response to a fourth SIP domain indicating that the connection destination is a connection destination to be connected via either the first ENUM/DNS client or the second ENUM/DNS client depending on the connection destination, and
when determining that the originating terminal is the terminal accommodated by the second ENUM/DNS client, convert the first SIP domain included in the REGEXP of the connection destination information response to a fifth SIP domain indicating that the connection destination is a connection destination to be connected via either the first ENUM/DNS client or the second ENUM/DNS client depending on the connection destination.

3. An E.164 Number Mapping (ENUM)/Domain Name System (DNS) system using an E.164 standard comprising:
an ENUM/DNS client that performs a connection destination information query indicating a connection destination associated with a telephone number of a destination terminal added to a connection request transmitted from an originating terminal; and an ENUM/DNS server that receives the connection destination information query and outputs the connection destination as a connection destination information response,
wherein the ENUM/DNS server includes one or more processors configured to
determine an attribute of the originating terminal, based on the connection destination information query, wherein determining the attribute of the originating terminal comprises determining whether the originating terminal is a test terminal or a general terminal, and
acquire the connection destination information response comprising connection destination information associated with the destination terminal, wherein the connection destination information response comprises a first Session Initiation Protocol (SIP) domain, and
i) in response to determining that the originating terminal is the test terminal, convert the first SIP domain included in REGEXP of the connection destination information response to a second SIP domain indicating that the connection destination is a connection destination to be connected via an Internet Protocol (IP)-Point Of Interface (POI), and
ii) in response to determining that the originating terminal is the general terminal, convert the first SIP domain included in the REGEXP of the connection destination information response to a third SIP domain indicating that the connection destination is a connection destination to be connected via either the IP-POI or an Synchronous Transfer Mode (STM)-POI.

4. The ENUM/DNS system according to claim 3,
wherein the ENUM/DNS client includes one or more processors configured to
select the connection destination, based on the second or third SIP domain.

5. The ENUM/DNS system according to claim 3, wherein the one or more processors are configured to
determine whether the originating terminal is a terminal accommodated by a first ENUM/DNS client or a terminal accommodated by a second ENUM/DNS client, based on the connection destination information query; and when determining that the originating terminal is the terminal accommodated by the first ENUM/DNS client, convert the first SIP domain included in the REGEXP of the connection destination information response to a fourth SIP domain indicating that the connection destination is a connection destination to be connected via either the first ENUM/DNS client or the second ENUM/DNS client depending on the connection destination, and when determining that the originating terminal is the terminal accommodated by the second ENUM/DNS client, convert the first SIP domain included in the REGEXP of the connection destination information response to a fifth SIP domain indicating that the connection destination is a connection destination to be connected via either the first ENUM/DNS client or the second ENUM/DNS client depending on the connection destination.

6. A control method for an E.164 Number Mapping (ENUM)/Domain Name System (DNS) system using an E.164 standard, the ENUM/DNS system including an ENUM/DNS client that performs a connection destination information query indicating a connection destination associated with a telephone number of a destination terminal added to a connection request transmitted from an originating terminal, and an ENUM/DNS server that receives the connection destination information query and outputs the connection destination as a connection destination information response, the control method comprising:

determining, by the ENUM/DNS server, an attribute of the originating terminal, based on the connection destination information query, wherein determining the attribute of the originating terminal comprises determining whether the originating terminal is a test terminal or a general terminal;

acquiring, by the ENUM/DNS server, the connection destination information response comprising connection destination information associated with the destination terminal, wherein the connection destination information response comprises a first Session Initiation Protocol (SIP) domain;

in response to determining that the originating terminal is the test terminal, converting, by the ENUM/DNS server, the first SIP domain included in REGEXP of the connection destination information response to a second SIP domain indicating the connection destination is a connection destination to be connected via an Internet Protocol (IP)-Point Of Interface (POI); and in response to determining that the originating terminal is the general terminal, converting, by the ENUM/DNS server, the first SIP domain included in the REGEXP of the connection destination information response to a third SIP domain indicating that the connection destination is a connection destination to be connected via either the IP-POI or an Synchronous Transfer Mode (STM)-POI.

7. The control method for the ENUM/DNS system according to claim 6, further comprising:

selecting, by the ENUM/DNS client, the connection destination, based on the converted second or third SIP domain.

8. The control method for the ENUM/DNS system according to claim 6, further comprising:

determining, by the ENUM/DNS server, whether the originating terminal is a terminal accommodated by a first ENUM/DNS client or a terminal accommodated by a second ENUM/DNS client, based on the connection destination information query; and when ENUM/DNS server determines that the originating terminal is the terminal accommodated by the first ENUM/DNS client, converting, by the ENUM/DNS server, the first SIP domain included in the REGEXP of the connection destination information response to a fourth SIP domain indicating that the connection destination is a connection destination to be connected via either the first ENUM/DNS client or the second ENUM/DNS client depending on the connection destination, and when ENUM/DNS server determines that the originating terminal is the terminal accommodated by the second ENUM/DNS client, converting, by the ENUM/DNS server, the first SIP domain included in the REGEXP of the connection destination information response to a fifth SIP domain indicating that the connection destination is a connection destination to be connected via either the first ENUM/DNS client or the second ENUM/DNS client depending on the connection destination.

* * * * *